(No Model.)
F. A. BURROWS.
SPRING MOTOR.
No. 575,050. Patented Jan. 12, 1897.
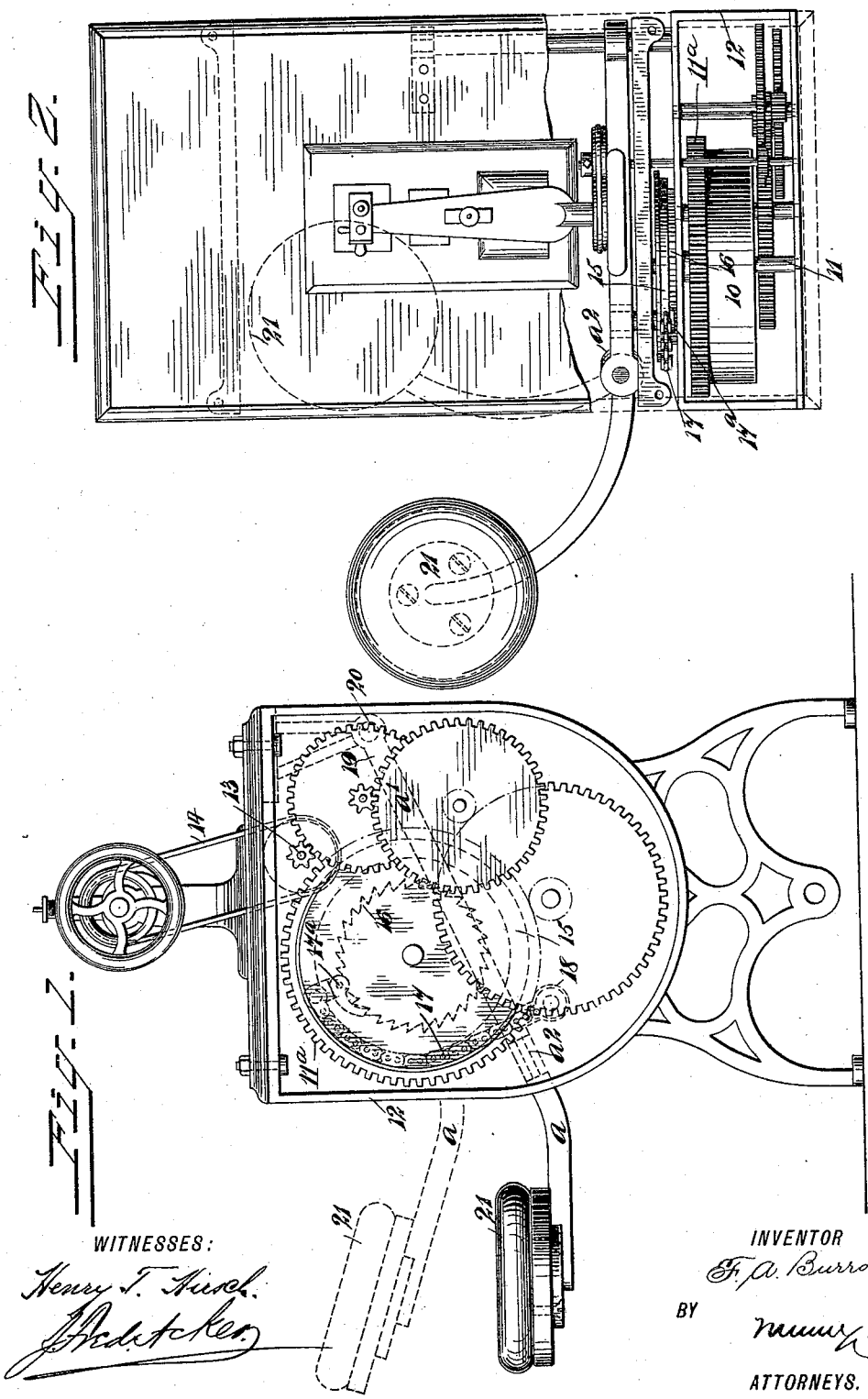
WITNESSES:
INVENTOR
F. A. Burrows.
BY
ATTORNEYS.

UNITED STATES PATENT OFFICE.

FRANCIS A. BURROWS, OF COLUMBIA, SOUTH CAROLINA, ASSIGNOR OF ONE-HALF TO JAMES P. RAWLS AND RUFUS N. RICHBOURG, OF SAME PLACE.

SPRING-MOTOR.

SPECIFICATION forming part of Letters Patent No. 575,050, dated January 12, 1897.

Application filed March 4, 1896. Serial No. 581,808. (No model.)

*To all whom it may concern:*

Be it known that I, FRANCIS A. BURROWS, of Columbia, in the county of Richland and State of South Carolina, have invented a new and Improved Spring-Motor, of which the following is a full, clear, and exact description.

The object of the invention is to construct a spring-motor especially adapted for the running of light machinery, particularly sewing-machines; and a further object of the invention is to provide a means whereby when the operator is seated at the machine the spring of the motor will be wound up sufficiently to set said motor in operation and whereby when the motor ceases to run the operator may again set the motor in operation by simply rising from the seat and sitting down again upon it.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1 is an end view of the sewing-machine, illustrating the application of the motor thereto; and Fig. 2 is a plan view of the sewing-machine with the motor attached, a portion of the table being broken away.

In an apparatus constructed on the lines of my invention a suitable casing 12 incloses the operative parts. The spring 10 is secured at its inner end to a drive-shaft 11 and at the outer end to a gear $11^a$, loose on the shaft 11 and having a multiplying-gear connection with a shaft 13, connected by a belt 14 with the driving-pulley of the machine to be driven.

A wheel 15 or a disk is loosely mounted on the driving-shaft 11 of the motor, and a ratchet-wheel 16 is secured upon shaft 11 and engaged by a pawl $17^a$, pivoted upon the loosely-mounted wheel or disk 15. A chain 17 is attached to the loosely-mounted wheel or disk 15, and the chain is carried downward and is attached to an arm 18, which is projected from a lever 19. This lever is fulcrumed upon a suitable portion of the frame or support of the machine, the fulcrum 20 of the lever being at its forward or outer end, and the said lever is preferably made in two sections $a$ and $a'$, the said sections being pivotally connected, as shown $a^2$, the said pivotal connection being so made that the rear or inner end of the lever may be carried inward beneath the bed of the machine, as shown in dotted lines in Fig. 2.

At the inner end of the lever 19 a seat 21 is secured or attached, and the said seat is adapted to accommodate the operator of the machine to which the motor may be applied. Normally the lever 19 will occupy the upper position, (shown in dotted lines in Fig. 1,) the said position being given to the lever when the operator rises from the seat, while the motor is yet wound, by reason of the chain-and-wheel connection between the lever and the driving-shaft of the motor.

In practice I will provide a weight or its equivalent, a spring, for raising the lever 19. This is not necessarily illustrated.

When the operator rests upon the seat 21, the lever will have been carried downward to the position shown in positive lines in Fig. 1, and the lever in passing to its lower position will revolve the loosely-mounted wheel 15 to a predetermined extent, and the rotary motion of the said wheel will be imparted to the driving-shaft 11 through the ratchet-and-pawl connection between the said shaft and the loosely-mounted wheel, or a clutch connection, if such is preferred, to the ratchet-and-pawl device, and consequently the driving-shaft 11 will be turned to wind the spring in the drum 10 to an extent which will enable the motor to apply power to the loose wheel $11^a$ and thence to the shaft 13. When the motor has expended its power, it can be rewound by the operator simply rising from the seat and then resuming his place upon it. Since an operator at a sewing-machine has ordinarily frequent occasion to rise from the machine during the progress of the work, the motor will be in proper shape for operation, especially since said motor is especially adapted for the running of sewing-machines in families.

The disk 16 may be provided with suitable means for preventing retrograde movement during the time at which the lever recovers its normal position.

When the machine is not in use, the rear end of the lever, or that end carrying the seat 21, may be carried under the bed of the machine out of the way.

Having thus described my invention, I claim as new and desire to secure by Letters Patent—

The combination with a casing, of a drive-shaft, a gear-wheel loose on the drive-shaft, a helical spring having one end fixed to the drive-shaft and one end to the gear-wheel, mechanism connected with the gear-wheel, a disk loose on the drive-shaft, a flexible connection attached to the disk, a lever carried by the casing and attached to the flexible connection, a pawl carried by the loose disk, and a ratchet-disk with which the pawl engages, substantially as described.

FRANCIS A. BURROWS.

Witnesses:
D. A. PRESSLEY,
E. H. BOYLES.